United States Patent
Frame et al.

(10) Patent No.: US 7,334,003 B2
(45) Date of Patent: Feb. 19, 2008

(54) METHODS AND SYSTEMS FOR EXTRACTING RELATED INFORMATION FROM FLAT FILES

(75) Inventors: Larry C. Frame, Omaha, NE (US); Mark Rowe, Papilion, NE (US)

(73) Assignee: First Data Corporation, Greenwood Village, CO (US)

( * ) Notice: Subject to any disclaimer, the term of this patent is extended or adjusted under 35 U.S.C. 154(b) by 456 days.

(21) Appl. No.: 10/044,484

(22) Filed: Jan. 11, 2002

(65) Prior Publication Data
US 2003/0135519 A1   Jul. 17, 2003

(51) Int. Cl.
*G06F 17/30* (2006.01)

(52) U.S. Cl. .............. 707/203; 707/1; 707/6; 707/7

(58) Field of Classification Search .......... 707/1–7, 707/200–204, 10, 100–102, 104.1; 715/526, 715/511; 345/764
See application file for complete search history.

(56) References Cited

U.S. PATENT DOCUMENTS

| | | | | |
|---|---|---|---|---|
| 5,666,553 A | * | 9/1997 | Crozier | 715/540 |
| 5,960,430 A | * | 9/1999 | Haimowitz et al. | 707/6 |
| 6,324,555 B1 | * | 11/2001 | Sites | 715/517 |
| 6,381,601 B1 | * | 4/2002 | Fujiwara et al. | 707/7 |
| 6,389,414 B1 | * | 5/2002 | Delo et al. | 707/4 |
| 6,405,218 B1 | * | 6/2002 | Boothby | 707/201 |
| 6,560,620 B1 | * | 5/2003 | Ching | 715/511 |
| 6,636,850 B2 | * | 10/2003 | Lepien | 707/6 |
| 6,658,626 B1 | * | 12/2003 | Aiken | 715/526 |
| 6,708,166 B1 | * | 3/2004 | Dysart et al. | 707/6 |
| 6,745,211 B2 | * | 6/2004 | Kabasakalian et al. | 707/204 |
| 6,775,683 B2 | * | 8/2004 | Kabasakalian et al. | 707/200 |
| 6,785,677 B1 | * | 8/2004 | Fritchman | 707/6 |
| 7,013,315 B1 | * | 3/2006 | Boothby | 707/203 |
| 7,076,485 B2 | * | 7/2006 | Bloedorn | 707/6 |
| 2002/0154816 A1 | * | 10/2002 | Gay | 382/190 |
| 2003/0004724 A1 | * | 1/2003 | Kahn et al. | 704/260 |

FOREIGN PATENT DOCUMENTS

WO   WO00/42544   *   7/2000

OTHER PUBLICATIONS

Product Overview, Microsoft SQL Server, www.microsoft.com, printed Apr. 5, 2002, 3 pages.

* cited by examiner

*Primary Examiner*—Debbie Le
(74) *Attorney, Agent, or Firm*—Townsend and Townsend and Crew LLP

(57) ABSTRACT

Methods and systems for extracting related information from multiple two-dimensional files are provided. The method includes comparing data contained in at least one field of each record of a first file to data in a related field of each record of a second file. A record is created in a temporary file for each occurrence of a match. The records of the temporary file contain the data from the matching records of the two files. Particular data is selected from the records of the temporary file according to user-specified conditions. The selected data is provided as output. The temporary file is thereafter deleted. In another embodiment of the invention, particular data is selected from the original files prior to inclusion in the temporary file. Associated systems are also provided.

20 Claims, 6 Drawing Sheets

| | | | |
|---|---|---|---|
| AEROBICS | AMES | BETTY | ~408 |
| AEROBICS | GILLOGY | ROBERTA | |
| AEROBICS | HAYES | TINA K | |
| AEROBICS | SCHILLER | SMITTY | |
| SOFTBALL | AMES | BETTY | ~409 |
| SOFTBALL | ANDERSON | HOOPER P | |
| SOFTBALL | CLOWN | BOZO T | |
| SOFTBALL | DEARING | JAMES | |
| SOFTBALL | FILIPOWICZ | FRED B | |
| SOFTBALL | FINK | RONALD D | |
| SOFTBALL | FLEMING | HOWARD W | |
| SOFTBALL | GILLOGY | ROBERTA | |
| SOFTBALL | HAYES | TINA K | |
| SOFTBALL | HOPKINS | HAROLD D | |
| SOFTBALL | JAMIL | FARRUKH | |
| SOFTBALL | PETERSEN | LAURENCE | ~412 |
| SOFTBALL | PETERSON | GREG K | |
| SOFTBALL | ROTH | BARB G | |
| SOFTBALL | SCHILLER | SMITTY | |
| SOFTBALL | VISHWANATHA | JAMBOOR K | |
| SOFTBALL | VIVIANO | ALFRED G | |
| SWIMMING | AMES | BETTY | ~410 |
| SWIMMING | ANDERSON | HOOPER P | |
| SWIMMING | CLOWN | BOZO T | |
| SWIMMING | DEARING | JAMES | |
| SWIMMING | FILIPOWICZ | FRED B | |
| SWIMMING | FLEMING | HOWARD W | |
| SWIMMING | GILLOGY | ROBERTA | |
| SWIMMING | HAYES | TINA K | |
| SWIMMING | HOPKINS | HAROLD D | |
| SWIMMING | PETERSEN | LAURENCE | ~414 |
| SWIMMING | PETERSON | GREG K | |
| SWIMMING | VIVIANO | ALFRED G | |
| TAE-KWON-DO | ANDERSON | HOOPER P | |
| TAE-KWON-DO | CLOWN | BOZO T | |
| TAE-KWON-DO | FLEMING | HOWARD W | |
| TAE-KWON-DO | GILLOGY | ROBERTA | |
| TAE-KWON-DO | HAYES | TINA K | |
| TAE-KWON-DO | HOPKINS | HAROLD D | |
| TAE-KWON-DO | JAMIL | FARRUKH | |
| TAE-KWON-DO | VISHWANATHA | JAMBOOR K | |
| 402 | 404 | 406 | |

| Reference Number | Label |
|---|---|
| 400 | Activity File |
| 402 | Activity Field |
| 404 | Last Name Field |
| 406 | First Name Field |
| 408, 409, 410 | Records Having "Betty Ames" |
| 412, 414 | Records Having "Laurence Petersen" |

FIG. 4

| CLEMENTS | JILL | 2612 WOOLWORTH AV | OMAHA | 68124 | 555-1234 |
| FILIPOWICZ | F B | 421 RIDGEWATER WAY | BELLEVUE | 68123 | 555-0001 |
| FLEMING | HOWARD W | 513 CLEVELAND ST | OMAHA | 68134 | 555-9032 |
| FRAHM | DOUG | 1417 MADISON ST | OMAHA | 68138 | 555-0091 |
| GATES | M | 9678 V PLZ | BELLEVUE | 68123 | 555-0790 |
| GILLOGY | ROBERTA | 4832 MANDERSON ST | OMAHA | 68134 | 555-0050 |
| GOTTSCH | ROBERT | 6214 N 114 ST | OMAHA | 68134 | 555-0921 |
| HAMILTON | DIANE K | 2625 VIRGINIA ST | BELLEVUE | 68123 | 555-3401 |
| HAYES | TINA K | 4201 S 40 AV | BELLEVUE | 68123 | 555-1204 |
| HOPKINS | HAROLD D | 7214 S 40 ST | OMAHA | 68124 | 555-0340 |
| JAMIL | FARRUKH | 318 CALIFORNIA ST | OMAHA | 68134 | 555-0300 |
| KAVA | CHARLES D | 11402 RALEIGH ST | PAPILLION | 68046 | 555-2093 |
| LINDBERG | LORI Q | 1176 CHARLES DR | RALSTON | 68127 | 555-9991 |
| MANGAN | THOMAS | 13105 LARIMORE CIR | ELKHORN | 68022 | 555-0991 |
| PETERSEN | L | 6803 N 68 PLZ | OMAHA | 68134 | 555-6602 |
| PETERSON | GREG K | 1329 S 146 | OMAHA | 68137 | 555-3056 |
| SANDERS | THOMAS A | 2629 WEBER ST | OMAHA | 68134 | 555-2203 |
| SCHULTE | GERALDINE R | 7235 N 79 PLZ | OMAHA | 68122 | 555-2947 |
| STRECKER | OTTO J E | 8324 CUMING ST | OMAHA | 68134 | 555-0901 |
| VISHWANATHA | JAMBOOR K | 905 PERRY ST | PAPILLION | 68046 | 555-1112 |
| VIVIANO | ALFRED G | 12501 COTTONWOOD LN | SPRINGFIELD | 68059 | 555-0340 |
| WHITE | JULIE Q | 15122 NORMANSY AV | OMAHA | 68134 | 555-9903 |
| ZAHN | STEPHANIE | 1630 N 107 AV | OMAHA | 68164 | 555-0000 |
| 502 | 504 | 506 | 508 | 510 | 512 |

| Reference Number | Label |
|---|---|
| 500 | Address File |
| 502 | Last Name Field |
| 504 | First Name Field |
| 506 | Street Address Field |
| 508 | City Field |
| 510 | Zip Code Field |
| 512 | Phone Number Field |

FIG. 5

| 402 | 404 | 406 | 502 | 504 | 506 | 500 | 510 | 512 |
|---|---|---|---|---|---|---|---|---|
| AEROBICS | GILLOGY | ROBERTA | GILLOGY | ROBERTA | 4832 MANDERSON ST | OMAHA | 68134 | 555-0050 |
| AEROBICS | HAYES | TINA K | HAYES | TINA K | 4201 S 40 AV | BELLEVUE | 68123 | 555-1204 |
| SOFTBALL | FLEMING | HOWARD W | FLEMING | HOWARD W | 513 CLEVELAND ST | OMAHA | 68134 | 555-9032 |
| SOFTBALL | GILLOGY | ROBERTA | GILLOGY | ROBERTA | 4832 MANDERSON ST | OMAHA | 68134 | 555-0050 |
| SOFTBALL | HAYES | TINA K | HAYES | TINA K | 4201 S 40 AV | BELLEVUE | 68123 | 555-1204 |
| SOFTBALL | HOPKINS | HAROLD D | HOPKINS | HAROLD D | 7214 S 40 ST | OMAHA | 68124 | 555-0340 |
| SOFTBALL | JAMIL | FARRUKH | JAMIL | FARRUKH | 318 CALIFORNIA ST | OMAHA | 68134 | 555-0300 |
| SOFTBALL | PETERSON | GREG K | PETERSON | GREG K | 1329 S 146 | OMAHA | 68137 | 555-3056 |
| SOFTBALL | VISHWANATHA | JAMBOOR K | VISHWANATHA | JAMBOOR K | 905 PERRY ST | PAPILLION | 68046 | 555-1112 |
| SOFTBALL | VIVIANO | ALFRED G | VIVIANO | ALFRED G | 12501 COTTONWOOD LN | SPRINGFIELD | 68059 | 555-0340 |
| SWIMMING | FLEMING | HOWARD W | FLEMING | HOWARD W | 513 CLEVELAND ST | OMAHA | 68134 | 555-9032 |
| SWIMMING | GILLOGY | ROBERTA | GILLOGY | ROBERTA | 4832 MANDERSON ST | OMAHA | 68134 | 555-0050 |
| SWIMMING | HAYES | TINA K | HAYES | TINA K | 4201 S 40 AV | BELLEVUE | 68123 | 555-1204 |
| SWIMMING | HOPKINS | HAROLD D | HOPKINS | HAROLD D | 7214 S 40 ST | OMAHA | 68124 | 555-0340 |
| SWIMMING | PETERSON | GRED K | PETERSON | GRED K | 1329 S 146 | OMAHA | 68137 | 555-3056 |
| SWIMMING | VIVIANO | ALFRED G | VIVIANO | ALFRED G | 12501 COTTONWOOD LN | SPRINGFIELD | 68059 | 555-0340 |
| TAE-KWON-DO | FLEMING | HOWARD W | FLEMING | HOWARD W | 513 CLEVELAND ST | OMAHA | 68134 | 555-9032 |
| TAE-KWON-DO | GILLOGY | ROBERTA | GILLOGY | ROBERTA | 4832 MANDERSON ST | OMAHA | 68134 | 555-0050 |
| TAE-KWON-DO | HAYES | TINA K | HAYES | TINA K | 4201 S 40 AV | BELLEVUE | 68123 | 555-1204 |
| TAE-KWON-DO | HOPKINS | HAROLD D | HOPKINS | HAROLD D | 7214 S 40 ST | OMAHA | 68124 | 555-0340 |
| TAE-KWON-DO | VISHWANATHA | JAMBOOR K | VISHWANATHA | JAMBOOR K | 905 PERRY ST | PAPILLION | 68046 | 555-1112 |

| Reference Number | Label |
|---|---|
| 600 | Address File |
| 402 | Activity Field |
| 404 | Last Name Field |
| 406 | First Name Field |
| 502 | Last Name Field |

| Reference Number | Label |
|---|---|
| 504 | First Name Field |
| 506 | Street Address Field |
| 500 | City Field |
| 510 | Zip Code Field |
| 512 | Phone Number Field |

EXAMPLE OUTPUT
FLEMING  HOWARD W
GILLOGY  ROBERTA
JAMIL    FARRUKH

METHODS AND SYSTEMS FOR EXTRACTING RELATED INFORMATION FROM FLAT FILES

BACKGROUND OF THE INVENTION

The present invention relates generally to extracting related data from electronic files. The present invention relates more specifically to systems and methods for selecting related information from one or more two-dimensional data files outside of a relational database environment.

Relational database systems are well known in the art. They are useful for organizing large amounts of data and manipulating and presenting the data in response to "queries," a term well known to those skilled in the art. However, relational database software is often expensive and technically challenging. Further, populating a newly created relational database with preexisting data is often time consuming. Therefore, a primary utility of a relational database system is limited in situations wherein large amounts of data preexist that do not require frequent manipulation.

The need exists for systems and methods for performing relational queries on two-dimensional data files that exist outside of relational database environments. It would be advantageous for such systems and methods to have the capability to relate information from two or more two-dimensional data files.

BRIEF SUMMARY OF THE INVENTION

In one embodiment, the invention provides a method of extracting related information from electronic files. The files each contain a plurality of records for containing data. The method includes comparing data contained in a key segment of each record of a first file to data in a related key segment of each record of a second file. Upon each occurrence of a match of data in the key segment of a record in the first file to data in the related key segment of a record in the second file, a record in a temporary electronic file is created, wherein the record in the temporary file includes data from the records of both the first and second files having matching key segments. Data is selected from records of the temporary file. The data is output. Thereafter, the temporary file may be deleted.

In another embodiment, the method further includes repeating the aforementioned process for additional files, wherein an additional is the first file and the temporary file is the second file.

The first file may be stored in electronic form on magnetic tape. Alternatively the first file may be stored on other media such as, for example, solid state memory, magnetic disk memory, and optical memory.

In another example, the method may also include ordering the records of the first file based on data contained in the at least one key segments.

A record in the temporary file created upon a match of data between records in the first and second files may contain less than all of the data from the matching records of the first and second files.

The particular data from specified records of the temporary file may be selected based in part on logic operators. The logic operators may include less than, greater than, equal to, not-equal-to, less-than-or-equal-to, greater-than-or-equal-to, in and not in.

In another embodiment, the present invention provides a system for extracting related information from electronic files. The system includes a processor, a storage device, and an output device. The system also includes a first electronic file stored on the storage device. The first electronic file contains a plurality of records for organizing data. The system also includes a second electronic file stored on the storage device which contains a plurality of records for organizing data. The processor is configured to compare data contained in a key segment of each record of the first file to data in a related key segment of each record of the second file. The processor is further configured such that upon each occurrence of a match of data in the key segment of a record in the first file to data in the related key segment of a record in the second file, the processor causes a record in a temporary electronic file to be created, wherein the record in the temporary file includes data from the records of both the first and second file having matching key segment data. The processor is further configured to select data from records of the temporary file and output the data to the output device. The processor is further configured to thereafter delete the temporary file.

In another embodiment, the present invention provides a computer-readable medium having computer-executable instructions for performing the method described above. The method includes receiving instructions identifying two or more electronic files from which to extract related information. Each file contains a plurality of records for organizing data. The method also includes receiving instructions identifying a key segment of each record of a first file and a related key segment of each record of a second file. The method further includes comparing data contained in the key segment of each record of the first file to the related key segment of each record of the second file. Upon each occurrence of a match of data in the key segment of a record in the first file to data in the related key segment of a record in the second file, a record is created in a temporary electronic file, wherein the record in the temporary file includes data from the records of both the first and second file having matching key segment data. Instructions identifying data to be selected from the temporary file are received. The data from records of the temporary file are selected. The data is output. Thereafter the temporary file may be deleted.

In another embodiment, the invention provides a temporary electronic file, comprising at least one record having a plurality of data fields. The data fields are related to data fields of records in a first and a second electronic file. The data in each record of the temporary file are identical to data in the related data fields of either the first or the second file.

BRIEF DESCRIPTION OF THE DRAWINGS

In the figures, similar components and/or features may have the same reference label.

FIG. 4 illustrates one example of an input data file from which information may be extracted according to the present invention.

FIG. 5 illustrates a second example of an input data file from which information may be extracted according to the present invention.

FIG. 6 illustrates a temporary data file created according to the present invention.

DETAILED DESCRIPTION OF THE INVENTION

Figure 1:
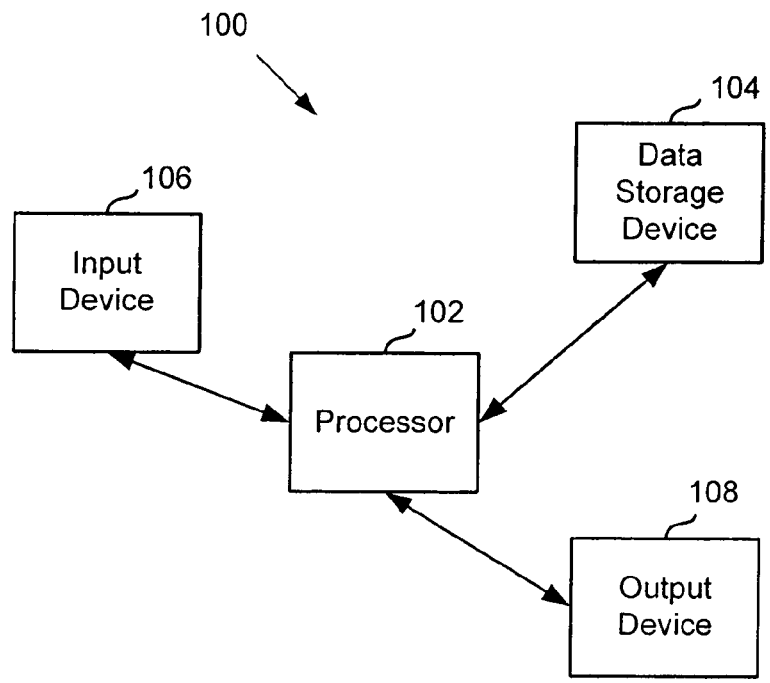
FIG. 1 illustrates a system for extracting related information from multiple two-dimensional electronic files according to one example of the present invention.

The present invention provides systems and methods for relating information between two or more two-dimensional electronic data files. The present invention is suitable for use with very large data files stored on a wide variety of electronic storage media, including magnetic tape, magnetic disk, solid state memory, optical storage and the like. It provides the ability to compare two or more data files based on one or more key fields, and extract data from the data files in response to the comparison and potentially other conditions. The present invention accomplishes this relational database-like functionality outside a relational database environment in a novel and heretofore unseen way.

The present invention includes a software application program that configures a programmable computer processor to respond to user commands entered through an input device. One example of a command set and associated syntax is provided in Tables 1 and 2 below. Through the command set, a user identifies two or more data files and the conditions upon which the user desires to relate information from the files. The user also specifies the desired output from the files.

TABLE 1

DVSQL Command Syntax

SELECT {DISTINCT} Alias1.(xl,yl), 'literal', Alias2.(x2,y2), etc.
    {COUNT(*) or COUNT(DISTINCT Alias1.(x1,y1)}
    {MAX(Alias1.(x1,y1)}
    {MIN(Alias1.(x1.y1)}
    {SUM(Alias1.x1,y1)} option to be added later
    {AVG(Alias1.(x1,y1)} option to be added later
    {EXISTS}
FROM DDname Alias1, DDname Alias2, etc
INTO DDname (if not provided, default of SQLOUT is assumed)
WHERE condition-1 AND/OR condition-2 etc (no parenthesis allowed)
ORDERED BY (x3,y3)A/D, (x4,y4)A/D, etc. (if A or D not provided,
    default of Ascending is assumed)

General Notation

Alias* ==> a 1 to 8 character alias used as shorthand notation to reference a file specified in the FROM verb
x* ==> a specified displacement into a record
y* ==> the length of the data at the specified displacement
DDname - DD name of the input/output file to be used. The character following allows for later identification of which fields of which file is being referenced with the A.(displ,length) nominclature.
conditions → Alias1.(x1,y1) operator Alias2.(x2,y2) (valid operators =,<>,<,>,<=,>=,IN,NOT IN )
    Alias1.(x1,y1) BETWEEN 'literal-1' AND 'literal-2'
    Alias1.(x1,y1) operator 'literal'
    Alias1.(x1,y1) class (ALPHA, INTEGER,ALPHANUMERIC)
    Alias1.(x1,y1) IN (literal-1,literal-2,literal-3, . . ., literal-x)
    Alias1.(x1,y1) IN (SELECT that defines a singular column
        table of values)
    Alias1.(x1,y1) NOT IN (SELECT that defines a singular
        column table of values)

COLUMN FUNCTIONS

| | |
|---|---|
| DISTINCT | Eliminate all duplicate keyed output record entries |
| MAX/MIN | Output record with the largest/smallest value on the field referenced |
| COUNT | Give number of rows in a table (records in a file) or if format COUNT(DISTINCT field), it gives the number of distinct values of the field found in the table/file. |
| AVG | Computes the average value of the specified field argument |
| SUM | Per specified fields, adds together all the values in that column |

TABLE 2

DVSQL EXEC PARM Options

DVSQL is invoked via the SYSTSIN REXX input stream and has execution environment PARMs available to better control the query output/s.
The format is as follows:
    //SYSTSIN DD *
    %DVSQL PNODE {WKDISP} {OUTDSN}

| | |
|---|---|
| PNODE - | (mandatory) the value of the primary node that all dynamically generated work data sets used in the DVSQL processing will be cataloged under |
| WKDISP - | (optional) disposition of the work file data sets after DVSQL processing has finished. Valid values are KEEP, *, and DELETE. KEEP will cause all of the work data sets to remain cataloged in the system. * and DELETE (the default) cause all of the DVSQL work data sets to be deleted. |
| OUTDSN - | (optional) data set name to be used to store final DVSQL output in after processing has completed. If the INTO verb is used in the primary level DVSQL, this parameter will be ignored. Also note that if this parameter is used, a value for the WKDISP PARM must also be provided. |

In response, the processor creates a temporary file containing the necessary data from the records of the user-specified files. The temporary file may exist only for a brief duration, or may be stored for other uses. The temporary file may exist on solid state memory associated with the processor, or the temporary file may be written to non-volatile memory such as magnetic or optical memory, or the like.

Once the necessary data from the user-specified files are contained in the temporary file, the processor produces output for the user based on the user-specified conditions. The output may be to a permanent electronic file, to a computer monitor, to a printer or the like. Having obtained the necessary information for the temporary file, the processor may then cause the temporary file to be deleted from memory. The following figures and description further explain the present invention.

FIG. 1 illustrates a system 100 according to one embodiment of the present invention. The system includes a processor 102 and a data storage device 104. The processor may be, for example, a mainframe computer, a personal computer, a workstation, or other programmable computing device. The processor is specifically programmed to perform the method according to the present invention. The data storage device 104 may be any one or a combination of, for example, solid state memory such as RAM, a disk drive or series of disk drives, a magnetic tape device, an optical storage system such as a compact disk drive, or other suitable data storage system. As used herein, data storage device may refer to more than one storage device, and the devices may be located in different physical locations.

The data storage device 104 contains two or more data files each containing one or more records of data. Data files, records and other database terms used herein are familiar to those skilled in the art. Reference is made throughout this description to data or records being in a certain order. While "order" will refer to a particular conceptual arrangement of information, it is not necessarily the case that the information is so arranged on the storage medium of the particular data storage device or devices.

The system 100 also includes an input device 106 through which the processor may be controlled and/or programmed. The input device 106 may also be used to enter data into the records of data files. The input device 106 may be any one or a combination of, for example, a keyboard, a mouse, a microphone or the like. The system 100 also includes an output device 108 for producing a visual representation of the result created by the present invention. The output device 108 may be a printer, computer monitor or the like.

Figure 2:
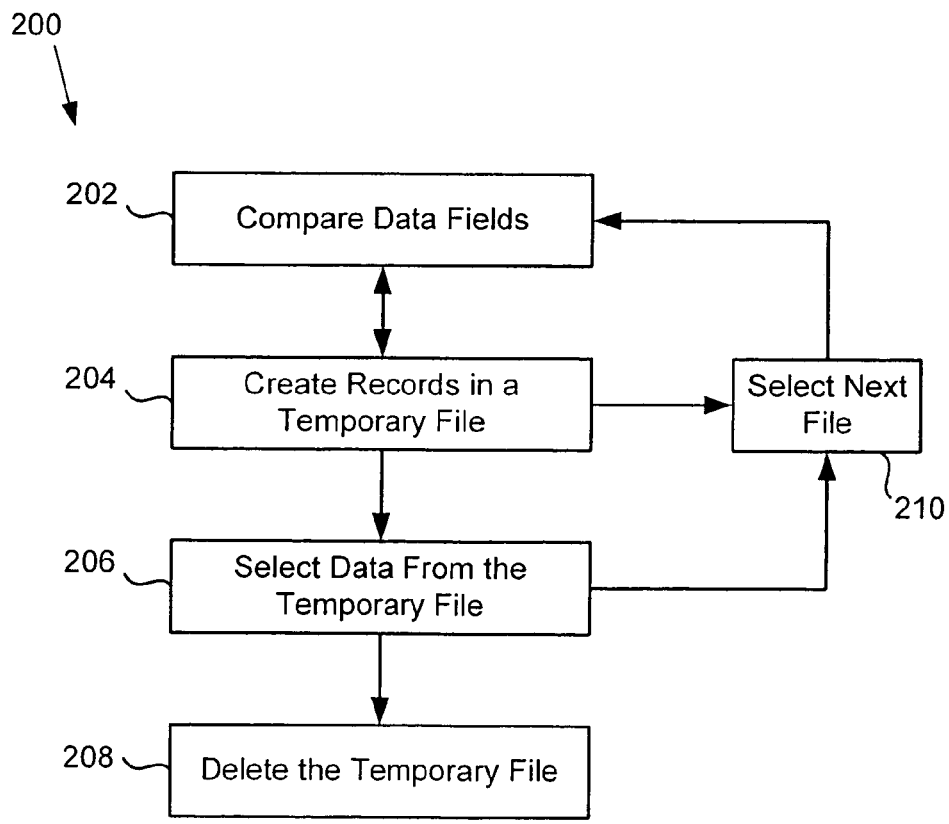
FIG. 2 illustrates a method of extracting related information from multiple two-dimensional electronic files according to one example of the present invention.
Figure 3:
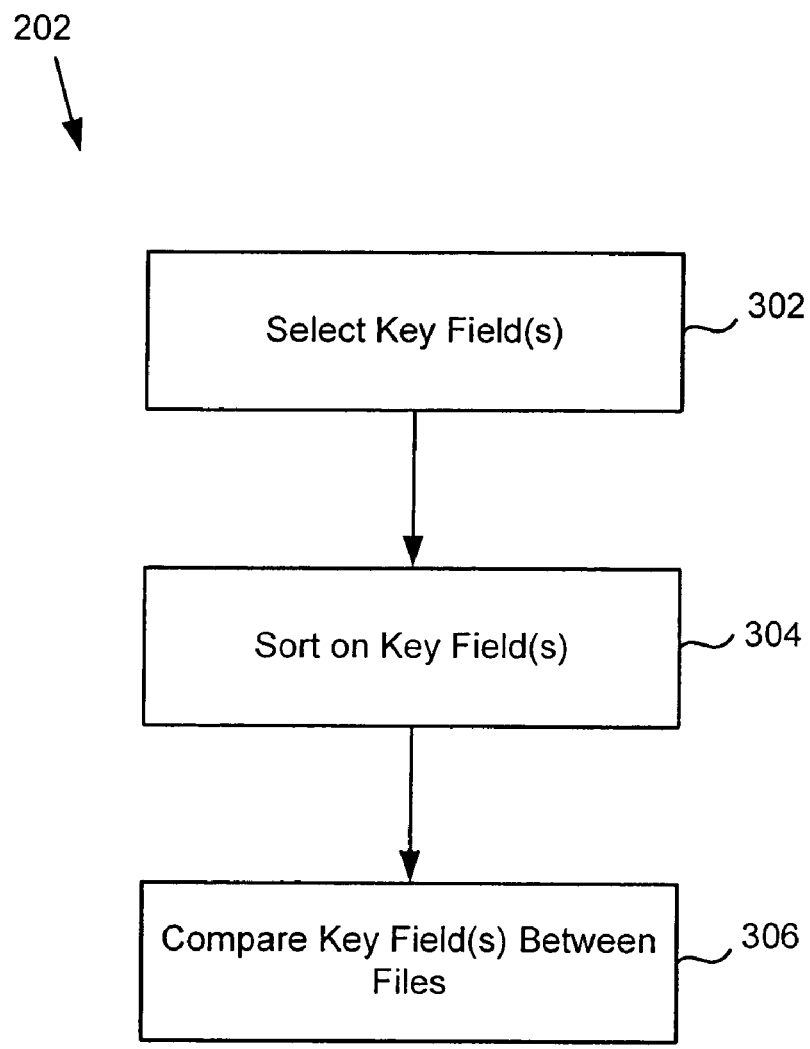
FIG. 3 illustrates in greater detail an operation of the method of FIG. 2.

FIG. 2 illustrates a method 200 for selecting related data from two or more electronic data files according to an embodiment of the present invention. The method 200 is performed on the system 100 of FIG. 1 according to the programming of the processor 102. The method 200 begins at operation 202 wherein two data files are compared. As previously stated, the data files are located on the data storage device 104. The operation 202 of comparing the data files is presented in more detail in FIG. 3.

As previously stated, the data files include one or more records of data. The records may be divided into fields of particular data types, although this is not necessarily the case. The records may each contain a sequence of undefined data. However, it is preferable that the records contain similar types of information in the same locations. At step 302 of FIG. 3, a key field or data segment of the record is selected. The key field or data segment contains the data through which the two data files are related. A non-limiting example will be provided hereinafter to more clearly describe this aspect of the present invention.

At step 304, both data files are sorted according to the data contained in the key field or data segment. Step 304 may be accomplished in any of a large number of ways well known to those having skill in the art. Although not essential to the successful operation of the present invention, step 304 increases the efficiency of the next step 306 in terms of processing time required to accomplish step 306.

At step 306, the data contained in the selected field or segment of the records of both data files are compared. Because the records in each file are sorted, it is not necessary to compare every record of one file with every record of the other file. However, this would be the case if the files are not sorted on the selected field or data segment.

Upon the occurrence of matching data, the process continues at operation 204 of FIG. 2. The transition from operation 202 to operation 204 may take place after the files are fully compared or after each occurrence of matching data, in which case the process would transition from operation 202 to operation 204 repeatedly until the files are fully compared.

At operation 204 of FIG. 2, a record is created in a temporary file each time data in the selected field or segment in a record of one file matches data in the selected field or segment in a record of the other file. The newly created record contains all the information of both records having a matching selected field or segment. In another embodiment of the invention, the newly created record contains only data required by a later operation.

At operation 206, information is selected from the temporary file. The selected information may be data from the selected field or segment that was used to relate the two original files. Alternatively, the selected information may come from other fields or segments of the records of the temporary file. The selected information may be conditional. That is, the information may be selected based on the content of any portion of the records of the temporary file. The use of logic functions to select records is well known. Operation 206 also includes displaying the information or otherwise producing a visual representation of the selected information.

At operation 208, the temporary file is deleted. Although not essential to the proper function of the present invention, deleting the temporary file conserves storage space. Alternatively, the temporary file could be stored for later use.

The present invention is not limited to relating two data files. Following operation 204, additional files may be included, as indicated by operation 210. If an additional file is to be included in the process, the additional file and the temporary file become the two files referred to in operation 202. Thereafter, the process is repeated for each additional file.

The foregoing description describes the operation of the present invention generally. It should be noted that the particular data files, the fields and segments used to related the data files and the information selected from the temporary files is determined by a user. The user provides the information to the processor via the input device or by other means well known to those skilled in the art.

Having described the present invention generally, a more detailed description will be provided by way of a specific, non-limiting example. In this example, a user is attempting to relate information from two electronic files, an activity file and a personal address file. A textual representation of the activity file is illustrated in FIG. 4, and a textual representation of the address file is shown in FIG. 5. The activity file 400 includes an activity field 402, a last name field 404, and a first name field 406. The activity file 400 might represent a listing of people participating in various activities in a sports organization, for example. As can be appreciated, the activity file 400 might list a person with the same first and last names participating in two different activities. For example, "Betty Ames" appears next to entries for both "Aerobics" 408, "Softball" 409, and "Swimming" 410. The address file 500 includes a last name field 502, a first name field 504, a street address field 506, a city field 508, a zip code field 510, and a phone number field 512.

In this example, the user is attempting to determine all the people from the address file who live in the 68134 zip code and play softball in the organization. Thus, the user is attempting to obtain related information from two, two-dimensional data files.

According to the present invention, the user identifies one or more fields of the files to compare. The user may communicate this information to a computer processor using an input device and a command language which the processor understands. The use of command languages are well known to those having skill in the art. As stated previously, Tables 1 and 2 include an example of the syntax of a command language according to an embodiment of the present invention.

In this example, the first name 406, 504 and last name fields 404, 502 are used to relate the two files. Thus, according to the invention, the files are individually sorted using the related fields. A sorted version of the activity file 400 is not shown; however, it is apparent to one skilled in the art how the sorted data would be arranged. The address file 500 is shown in FIG. 5 sorted by last name. As stated previously, the sorting operation is optional, although it increases the efficiency of the method of the present invention.

According to the invention, the files are compared to determine which records of the two files have matching data in the related fields. A temporary file is created having a record for each match in the comparison between the files. FIG. 6 illustrates a temporary file 600 for this example.

As can be appreciated with reference to FIG. 6, the temporary file 600 includes all the fields from both of the two original files 400, 500. However, the temporary file 600 does not necessarily include all the data from the two original files 400, 500. Further, it is also apparent that the last name 404, 502 and first name 406, 504 fields appear twice in the temporary file 600. In another example of the invention, both the related fields might not be included in the temporary file 600 since the fields contain matching data for each record included in the temporary file 600, according to the present invention. It is further apparent that similar data might be included in the temporary file more than once (e.g., Tina K Hayes 602, 604, 606). However, the appearance of such names in different records is a result of the name fields being associated with different activities in the activity field 402.

It should also be noted that some apparent matches are not included among the records of the temporary file. For example, the address file 500 included "L Petersen" 514 and "Laurence Petersen" appeared several times (412, 414) in the activity file 400. However, "L" does not match "Laurence" according to this example of the present invention; therefore, associated records are not included in the temporary file 600. Other embodiments of the present invention could include logic that either includes or further evaluates such situations.

In an alternative embodiment of the present invention, the content of the temporary file 600 may be reduced in one or more of several ways. First, the method of the present invention might begin by creating an interim temporary file for each of the original files having only data meeting specified criteria. For instance, in this example, the interim file associated with the activity file 400 would include only the data from the records having "softball" in the activity field 402. Also, the interim file associated with the address file 500 would only include the data from the records having "68134" in the zip code field 510. Thus, the size of the temporary file 600 would be substantially reduced.

An additional approach to potentially reducing the size of the temporary file 600 is to limit the data that is entered into the records of the temporary file. For instance, in the present example, the data in the street address field 506 is not used to produce the user-requested output. Therefore, the temporary file 600 might not include the street address field 506, in which case, the size of the temporary file 600 would be further reduced. Other such space-saving measures are now apparent to those skilled in the art in light of this disclosure.

Figure 7:
FIG. 7 illustrates the output produced according to one example of the present invention.

Continuing with this example of the present invention, including the temporary file 600 of FIG. 6, another step in the method will be discussed. The temporary file 600 may now be evaluated to determine which records include data that matches the specified conditions of the present example. Thus, for each record that includes "softball" in the activity field 402 and "68134" in the zip code field 510, the data from the first name 406, 504 and last name 404, 502 fields are provided to the user. This may be accomplished by creating an output record, a printed page, a visual representation on a computer monitor, or the like. One example of such output is illustrated in FIG. 7, which includes the three names from this example that match the specified conditions.

The foregoing discussion illustrates but one example of the present invention. Numerous additional embodiments and equivalents are apparent to those skilled in the art in light of this disclosure. Therefore, the invention is not limited by this disclosure but is intended to be interpreted in light of the following claims.

What is claimed is:

1. A method of extracting related information from electronic files, wherein each file includes a plurality of records and wherein each record includes at least one field for containing data, the method comprising:
 a) receiving a user designation of at least first and second electronic files, wherein the first and second electronic files comprise two-dimensional files, each having a plurality of fields and a plurality of records, and wherein the first and second electronic files have in common at least one common field in which similar data is stored for each record in each of the first and second electronic files;
 b) receiving a user input that designates one of the at least one common fields to be a key segment;
 c) sorting the records of the first and second electronic files based on the key segment;
 d) comparing key segment data of the first and second electronic files;
 e) upon each occurrence of a match of key segment data of a record in the first electronic file to key segment data of a record in the second electronic file, creating a record in a temporary electronic file, wherein the record in the temporary file includes a copy of the matching key second data from the first and second electronic files;
 f) also upon each occurrence of a match of key segment data of a record in the first electronic file to key segment data of a record in the second electronic file, copying additional data from the first electronic file and the second electronic file into the record in the temporary file;
 g) selecting data from the temporary file; and
 h) outputting the selected data.

2. The method recited in claim 1, further comprising thereafter deleting the temporary file.

3. The method recited in claim 1, further comprising:
 for additional electronic files, repeating at least steps b), and c), d), e), and f) using an additional electronic file as the first electronic file and the temporary file as the second electronic file.

4. The method recited in claim 1, wherein the first electronic file is stored in electronic form on magnetic tape.

5. The method recited in claim 1, wherein the first electronic file is stored in electronic form on media selected from a group consisting of solid state memory, magnetic disk memory, and optical memory.

6. The method of claim 1, wherein a record of the temporary file created upon a match of data between records in the first and second electronic files contains less than all of the data from the matching records of the first and second electronic files.

7. The method of claim 1, further comprising selecting data from the records of the temporary file based in part on logic operators.

8. The method of claim 7, wherein the logic operators are selected from a group consisting of less than, greater than, equal to, not-equal-to, less-than-or-equal-to, greater-than-or-equal-to, in and not in.

9. A system for extracting related information from electronic files, comprising:
 a processor;
 a storage device having a plurality of electronic data files stored thereon;
 an output device;
 wherein the processor is configured to:
  receive a user designation of at least one of the electronic data files as a first electronic files and at least one of the electronic files as a second electronic file, wherein the first and second electronic files comprise two-dimensional files, each having a plurality of fields and a plurality of records, and wherein the first and second electronic files have in common at least one common field in which similar data is stored for each record in each of the first and second electronic files;

receive a user input that designates one of the at least one common fields to be a key segment;

sort the records of the first and second electronic files based on the key segment;

compare key segment data of the first and second electronic files;

upon each occurrence of a match of key segment data of a record in the first electronic file to key segment data of a record in the second electronic file, create a record in a temporary electronic file, wherein the record in the temporary file includes a copy of the matching key second data from the first and second electronic files;

also upon each occurrence of a match of key segment data of a record in the first electronic file to key segment data of a record in the second electronic file, copy additional data from the first electronic file and the second electronic file into the record in the temporary file;

select data from the temporary file; and output the selected data.

10. The system of claim 9 wherein the processor is further configured to thereafter delete the temporary file.

11. The system of claim 9, wherein the first electronic file is stored on the storage device on magnetic tape.

12. The system of claim 9, wherein the first electronic file is stored on the storage device on media selected from a group consisting of solid state memory, magnetic disk memory, and optical memory.

13. The system of claim 9, wherein a record of the temporary file created upon a match of data between records in the first and second electronic files contains less than all of the data from the records of the first and second electronic files.

14. The system of claim 9, wherein the processor is further configured to select data from records of the temporary file based in part on logic operators.

15. The system of claim 14, wherein the logic operators are selected from a group consisting of less than, greater than, equal to, not-equal-to, less-than-or-equal-to, greater-than-or-equal-to, in and not in.

16. A computer-readable medium having computer-executable instructions for performing a method comprising:

a) receiving a user designation of at least first and second electronic files, wherein the first and second electronic files comprise two-dimensional files, each having a plurality of fields and a plurality of records, and wherein the first and second electronic files have in common at least one common field in which similar data is stored for each record in each of the first and second electronic files;

b) receiving a user input that designates one of the at least one common fields to be a key segment;

c) sorting the records of the first and second electronic files based on the key segment;

d) comparing key segment data of the first and second electronic files;

e) upon each occurrence of a match of key segment data of a record in the first electronic file to key segment data of a record in the second electronic file, creating a record in a temporary electronic file, wherein the record in the temporary file includes a copy of the matching key second data from the first and second electronic files;

f) also upon each occurrence of a match of key segment data of a record in the first electronic file to key segment data of a record in the second electronic file, copying additional data from the first electronic file and the second electronic file into the record in the temporary file;

g) selecting data from the temporary file; and h) outputting the selected data.

17. The medium of claim 16, wherein the method fun her includes thereafter deleting the temporary file.

18. The medium of claim 16, wherein the method farther includes:

for additional electronic files, repeating at least steps b), c) and d), e), and f) using an additional electronic file as the first electronic file and the temporary file as the second electronic file.

19. The medium of claim 16, wherein the method fun her includes selecting data from records of the temporary file based in part on logic operators.

20. The medium of claim 19, wherein the logic operators are selected from a group consisting of less than, greater than, equal to, not-equal-to, less-than-or-equal-to, greater-than-or-equal-to, in and not in.

* * * * *

UNITED STATES PATENT AND TRADEMARK OFFICE
CERTIFICATE OF CORRECTION

PATENT NO. : 7,334,003 B2
APPLICATION NO. : 10/044484
DATED : February 19, 2008
INVENTOR(S) : Larry C. Frame et al.

It is certified that error appears in the above-identified patent and that said Letters Patent is hereby corrected as shown below:

Column 10, claim 17, line 28, delete "fun her" and insert --further--

Column 10, claim 18, line 30, delete "farther" and insert --further--

Column 10, claim 19, line 36, delete "fun her" and insert --further--

Signed and Sealed this

Fifth Day of August, 2008

JON W. DUDAS
*Director of the United States Patent and Trademark Office*